United States Patent Office 3,576,790
Patented Apr. 27, 1971

3,576,790
NEW CATALYST SYSTEMS FOR THE PRODUCTION OF POLYESTERS
Brian W. Pengilly, Yuzi Okuzumi, and Bernard J. Plaster, Akron, Ohio, assignors to The Goodyear Tire & Rubber Company, Akron, Ohio
No Drawing. Filed Aug. 20, 1969, Ser. No. 851,720
Int. Cl. C08g 17/015; C07c 67/02
U.S. Cl. 260—75
19 Claims

ABSTRACT OF THE DISCLOSURE

Highly polymeric linear polyesters are prepared by subjecting a bis ester of dicarboxylic acid to alcoholysis in the presence of a glycol and a catalytic amount of a compound having the general formula $$M(MnO_4)_2$$

wherein M is a metal selected from the group consisting of magnesium, calcium, zinc, cadmium, strontium, barium and manganese followed by condensation polymerization with the removal of glycol.

---

This invention relates to an improved method for preparing highly polymeric linear condensation polyesters of dicarboxylic acids and glycols.

The prior art to which this invention relates shows various methods of preparing linear condensation polyesters. A great number of catalysts that can be used have been disclosed. The prior art also discloses that combinations of catalyst can be employed to produce improved results in some instances. However, it is apparent that results that may be obtained cannot be predicted.

Of great significance in selecting catalysts for use in preparing polyesters is the avoidance of side reactions which lead to the formation of by-products or foreign matter in the polyester being produced. This is especially critical in the case of those polyesters to be used to form films and to form fibers for textile uses. The extent of the undesirable side reactions is usually high when the reaction rate is slow or when the catalyst concentration is too high.

The process employed in preparing the polyesters is the ester interchange process in which bis esters of dicarboxylic acids are reacted in the presence of catalysts with a glycol under conditions facilitating removal of the alkanol from the bis ester by ester interchange with the glycol to form glycol esters or low molecular weight polymers thereof. This is referred to as the first stage of the polyester preparation and can be conducted under a wide range of conditions using different types of apparatus. For example, one mol of the bis ester and from 1 to 2.5 or more mols of the glycol can be placed in a reaction vessel equipped with a column and a distilling head, the reaction vessel being heated at a temperature which permits the alkanol to pass through the column with the glycol being retained by the column and returned to the reaction vessel whereby substantially all of the alkanol which can theoretically be produced is removed during this first stage of the polyester preparation which results in a substantially monomeric prepolymer.

The second stage of the polyester preparation involves condensing the product produced during the first stage whereby glycol is removed and long chain polyester molecules are produced. The polymerization is accomplished under conditions facilitating the removal of glycol so that the ultimate ratio of dicarboxylic acid units to glycol units in the polymer formed is essentially 1:1. The polymerization is carried out until the polymer formed is of high molecular weight. Generally it will be carried out until the polymer has an intrinsic viscosity of at least 0.4 and usually until it has an intrinsic viscosity of 0.5 or higher.

The polymerization of the first stage product starts generally during the earlier phases by heating at a temperature above the boiling point of the glycol at whatever pressure is required for removal of the glycol through the condenser or other device attached to the reaction vessel. As the glycol is removed the temperature is raised and the pressure is gradually reduced so that temperatures considerably above the boiling point of the glycol but below the decomposition temperature of the product and pressures below about 10 millimeters of mercury pressure are attained. Generally the pressure is as low as the apparatus can produce and is usually less than 1 millimeter of mercury pressure.

It is an object of this invention to provide catalysts which are very active and accelerate the ester interchange reaction between a glycol and an ester of a dicarboxylic acid. It is another object of the invention to provide a process for preparing polymeric linear condensation polyesters using a catalyst composition which produces rapid reaction rates.

It is still another object of the invention to provide a process for preparing polymeric linear condensation polyester which produces polyester fibers, films and coatings having a low degree of color. Still another object of this invention is to provide an improved process for preparing highly polymeric polymethylene terephthalate from a glycol and a lower alkyl ester of terephthalic acid. Another object is to provide a new catalyst system which is soluble in ethylene glycol and will result in a very rapid ester interchange reaction and subsequent polymerization reaction in the preparation of polyethylene terephthalate from glycol and dimethyl terephthalate.

Other objects will be apparent as the description of the invention proceeds.

According to this invention it has been found that compounds having the general formula $M(MnO_4)_2$, where M is a metal selected from the group consisting of magnesium, calcium, zinc, cadmium, strontium, barium and manganese, are highly effective or promoting the ester interchange reaction and subsequent polymerization reaction between a glycol and an ester of a dicarboxylic acid. Even better results are obtained by use of a secondary or auxiliary catalyst used in combination with the catalysts of this invention, especially with reference to the second stage of the polymerization reaction. Antimony compounds are particularly effective secondary catalysts.

The following examples of several preferred embodiments will further serve to illustrate the present invention. All parts and percentages are by weight unless otherwise indicated.

EXAMPLE 1

A glass reaction tube approximately 35 centimeters long having an inside diameter of 38 millimeters, equipped with a sidearm, a nitrogen gas inlet tube and stirrer was charged with 50 grams of dimethyl terephthalate, 40 grams of ethylene glycol and 0.02 gram of $Mn(MnO_4)_2$. Nitrogen gas was slowly passed into the reaction tube and over the mixture. The mixture was stirred and heated for 75 minutes, at which time the ester interchange reaction was completed, by means of a vapor bath which surrounds the tube and having a temperature of 240° C. Then 0.015 gram of antimony trioxide was added to the reaction mixture and the polymerization continued under polycondensation conditions of 280° C. and a pressure of 0.5 millimeter of mercury for two hours. A colorless polyester having an intrinsic viscosity of 0.82 was obtained.

EXAMPLE 2

The procedure of Example 1 was followed except that 0.01 gram of $Zn(MnO_4)_2 \cdot 6H_2O$ was used as the ester interchange catalyst. The ester interchange reaction was complete in 75 minutes. A colorless polyester having an intrinsic viscosity of 0.85 was obtained.

EXAMPLE 3

The procedure of Example 1 was followed except that 0.01 gram of $Mg(MnO_4)_2 \cdot 6H_2O$ was used as the ester interchange catalyst. A colorless polyester having an intrinsic viscosity of 0.62 was obtained.

EXAMPLE 4

The procedure of Example 1 was followed except that 0.028 gram of $Cd(MnO_4)_2 \cdot 6H_2O$ was used as the ester interchange catalyst. The ester interchange reaction was complete in 75 minutes. A colorless polyester having an intrinsic viscosity of 0.68 was obtained.

The intrinsic viscosity of each of the samples was determined in a 60/40 phenol-tetrachloroethane mixed solvent at 30° C.

The effect of the metals in the compounds of this invention has been illustrated particularly with respect to the use of manganese, magnesium, zinc and cadmium. Representative examples of other metals are calcium, barium and strontium.

The amount of the metal compound used will ordinarily be very small. Usually the amount will be in the range of from 0.0001 to 0.1 percent by weight, and preferably in the range of from 0.001 to 0.06 percent by weight based on the dicarboxylic acid esters used. The auxiliary catalyst used in combination with the catalysts of this invention will be ordinarily small. Usually the amount will be in the range of from 0.001 to 0.05 percent (calculated as metal) based on the dicarboxylic acid ester used.

The catalysts of this invention can be used as the sole ester interchange catalyst. However, as shown above, it is advantageous to use it in combination with other catalysts, especially in the condensation reaction. Glycol soluble antimony compounds are particularly effective condensation catalysts and act conjointly with the ester interchange catalyst present to promote the condensation of the glycol esters formed in the alcoholysis reaction to form high molecular weight polymers in shortened reaction periods. Representative examples of antimony compounds are antimony acetate, antimony trioxide, antimony glycolate and other glycol soluble antimony compounds.

The auxiliary condensation catalyst can be added to the reactants along with the ester interchange catalysts at the beginning of the alcoholysis reaction, or, if desired, can be added to the glycol esters formed by such reaction prior to the start of the condensation reaction.

The practice of the invention has been illustrated with particular respect to the preparation of polymeric ethylene terephthalate. Polymeric ethylene isophthalate and copolyesters containing various ratios of ethylene terephthalate to ethylene isophthalate and other polyesters can similarly be made using the catalysts of the invention.

The examples illustrate the invention particularly by using the dimethyl esters of terephthalic acid and ethylene glycol. The invention is effective with other esters, such as the ethyl, propyl, butyl and phenyl esters of the phthalic acids and of other aromatic and aliphatic acids. Thus the catalyst combination can be used in the preparation of polyesters derived from other acids and/or other glycols. Representative examples of such other acids are aliphatic acids of the formula

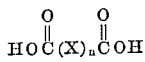

where X is an alkylene group and $n$ is zero to 10, such as oxalic acid, malonic acid, succinic acid, glutaric acid, adipic acid, sebacic acid, suberic acid, etc.; methyl succinic acid, α-methyl adipic acid; aromatic acids, such as the phthalic acids, the naphthalene dicarboxylic acids, the diphenyl dicarboxylic acids; and araliphatic acids such as α,β-diphenyl ethane-4,4-dicarboxylic acid. Representative examples of other glycols that can be used are trimethylene glycol, propylene glycol, tetramethylene glycol, pentamethylene glycol, neopentyl glycol, hexamethylene glycol, decamethylene glycol, alkyl-substituted polymethylene glycols such as 2,2-dimethyl-1,3-propane diol, 2,2-diethyl-1,3-propane diol, diethylene glycol, 2,2-bis[4-(β-hydroxyethoxy)phenyl] propane and cyclohexane dimethanol. The phthalic acids and ethylene glycol are preferred because of their low cost and ready availability. Thus in a preferred embodiment ethylene glycol is reacted with a bis ester of at least one acid selected from the group consisting of terephthalic acid and isophthalic acid and the resulting glycol ester or low polymer thereof condensed to form a high molecular weight linear polyester in the presence of the catalyst of the invention.

While certain representative embodiments and details have been shown for the purpose of illustrating the invention it will be apparent to those skilled in this art that various changes and modifications may be made therein without departing from the spirit or scope of the invention.

What we claim is:

1. In a process for preparing highly polymeric linear, fiber or film-forming polyester by subjecting a bis ester selected from the group consisting of methyl, ethyl, propyl, butyl and phenyl esters of a dicarboxylic acid to alcoholysis in the presence of an excess of a glycol and thereafter condensing the glycol ester formed, with the removal of glycol the improvement which comprises conducting the alcoholysis in the presence of a catalytic amount of an ester interchange catalyst compound having the general formula $M(MnO_4)_2$ where M is a metal selected from the group consisting of magnesium, calcium, zinc, cadmium, strontium, barium and manganese.

2. The process of claim 1 in which the bis ester of dicarboxylic acid is dimethyl terephthalate.

3. The process of claim 1 in which the glycol used is selected from the group consisting of ethylene glycol, propylene glycol, tetramethylene glycol, pentamethylene glycol, hexamethylene glycol, neopentyl glycol and cyclohexane dimethanol.

4. The process of claim 1 in which the glycol used is ethylene glycol.

5. The process of claim 1 in which the glycol used is tetramethylene glycol.

6. The process of claim 1 in which the catalyst is manganese permanganate.

7. The process of claim 1 in which the catalyst is zinc permanganate.

8. The process of claim 1 in which the catalyst is magnesium permanganate.

9. The process of claim 1 in which the catalyst is cadmium permanganate.

10. In a process for preparing a highly polymeric linear, fiber or film-forming polyester by subjecting at least one bis ester selected from the group consisting of methyl, ethyl, propyl, butyl and phenyl esters of a dicarboxylic acid to alcoholysis in the presence of an excess of a glycol and thereafter condensing the glycol ester formed, with the removal of glycol, the improvement which comprises conducting both the alcoholysis and the condensation in the presence of a catalytic amount of an ester interchange and condensation catalyst compound having the general formula $M(MnO_4)_2$ where M is a metal selected from the group consisting of magnesium, calcium, zinc, cadmium, strontium, barium and manganese.

11. The process of claim 10 in which the condensation reaction is conducted in the presence of an auxiliary catalyst selected from glycol soluble antimony compounds.

12. The process of claim 10 in which the bis ester of dicarboxylic acid is dimethyl terephthalate.

13. The process of claim 10 in which the glycol used is selected from the group consisting of ethylene glycol, propylene glycol, tetramethylene glycol, pentamethylene glycol, hexamethylene glycol, neopentyl glycol and cyclohexane dimethanol.

14. The process of claim 10 in which the glycol used is ethylene glycol.

15. The process of claim 10 in which the glycol used is tetramethylene glycol.

16. The process of claim 10 in which the catalyst is manganese permanganate.

17. The process of claim 10 in which the catalyst is zinc permanganate.

18. The process of claim 10 in which the catalyst is magnesium permanganate.

19. The process of claim 10 in which the catalyst is cadmium permanganate.

References Cited

UNITED STATES PATENTS 3,475,380  10/1969  Price et al. _____ 260—75

WILLIAM H. SHORT, Primary Examiner

L. P. QUAST, Assistant Examiner

U.S. Cl. X.R.

260—47, 475, 485